United States Patent [19]

Berta

[11] Patent Number: 4,591,617

[45] Date of Patent: May 27, 1986

[54] CROSSLINKING COMPOSITION FOR BUTYL RUBBER OR HALOBUTYL RUBBER AND EPIHALOHYDRIN RUBBER BLENDS

[75] Inventor: Dominic A. Berta, Wilmington, Del.

[73] Assignee: Hercules Incorporated, Wilmington, Del.

[21] Appl. No.: 691,334

[22] Filed: Jan. 14, 1985

[51] Int. Cl.$^4$ .............................................. C08L 71/02
[52] U.S. Cl. ............................ 525/187; 156/502; 156/503; 525/151; 525/352; 525/368; 525/369; 525/370; 525/373; 525/412
[58] Field of Search ............... 525/187, 151, 370, 412, 525/355, 368, 369, 373, 352

[56] References Cited

U.S. PATENT DOCUMENTS

| | | | |
|---|---|---|---|
| 3,096,301 | 7/1963 | Jankowski et al. | 525/151 |
| 3,261,789 | 7/1966 | Berger et al. | 525/370 |
| 3,351,517 | 11/1967 | Willis | 161/184 |
| 3,586,087 | 6/1971 | Messerly et al. | 152/330 |
| 3,649,715 | 3/1972 | Oetzel | 525/355 |
| 3,787,376 | 1/1974 | Nakamura et al. | 525/412 |

*Primary Examiner*—Jacob Ziegler
*Attorney, Agent, or Firm*—William E. Player

[57] ABSTRACT

Disclosed are crosslinking compositions having both sulfur and nonsulfur curative systems which are particularly adapted for crosslinking rubber blends of (a) from about 35% to about 85% halobutyl rubber or a mixture of butyl rubber and halobutyl rubber wherein the halobutyl rubber is at least 50% by weight of the mixture and (b) from about 15% to about 65% of an epihalohydrin rubber, and to the rubber materials crosslinked therewith. The rubber materials crosslinked with these crosslinking compositions have an excellent balance of cure rate, cure state and scorch safety; have improved tire carcass adhesion and good impermeability to gases; and are useful in tire inner tubes and inner liners.

22 Claims, No Drawings

CROSSLINKING COMPOSITION FOR BUTYL RUBBER OR HALOBUTYL RUBBER AND EPIHALOHYDRIN RUBBER BLENDS

This invention relates to a crosslinking composition having sulfur and nonsulfur curative systems, said composition being adapted particularly for crosslinking blends of (a) halobutyl rubber or a mixture of butyl rubber and halobutyl rubber wherein the halobutyl rubber is at least 50% by weight of the mixture and (b) an epihalohydrin rubber, and to the rubber materials crosslinked therewith. The rubber materials cured with the crosslinking composition of this invention have an excellent balance of cure rate, cure state, scorch safety and physical properties; have improved tire carcass adhesion and good impermeability to gases, especially air; and are useful in tire inner tubes and inner liners for pneumatic tires, where sensitivity to gas entrapment is important.

Tire liners based on blends of chlorobutyl rubber with natural rubber or reclaimed butyl rubber or both, experience difficulty due to sensitivity to entrapment of gases, particularly air. In the past, epichlorohydrin rubber has been added to the aforementioned blends to improve impermeability (See, e.g., U.S. Pat. No. 3,586,087). However, while these tire liner compositions have good air impermeability, they do not have a good balance of cure rate, scorch safety and physical properties, and do not adhere well to the tire carcasses, which are primarily natural rubber.

This invention provides a novel crosslinking composition for use in crosslinking or vulcanizing rubber blends of, by weight, (a) from about 35% to about 85% of halobutyl rubber or a mixture of butyl rubber and halobutyl rubber wherein the halobutyl rubber is at least 50% by weight of the mixture, and (b) from about 15% to about 65% of epihalohydrin rubber. The crosslinking composition consists essentially of, by weight of the rubber blend, (1) from about 1.0 parts to about 20 parts of a sulfur curative system, as hereinafter defined, and (2) from about 0.3 parts to about 10 parts of a nonsulfur curative system, as hereinafter defined.

The crosslinking compositions of this invention provide cured or crosslinked rubber materials have good impermeability, i.e., resistance to gas or air diffusion, without an adverse effect on the physical properties of the cured composition, such as tensile strength and modulus.

The crosslinking composition is formulated with (1) a sulfur cure package comprising sulfur, a sulfur accelerator, and a zinc oxide promotor and (2) a nonsulfur curative system comprising a nonsulfur crosslinking agent and a metal compound promotor. Sulfur curative systems cure through the unsaturation present in halobutyl rubber or mixtures thereof with butyl rubber. The nonsulfur curative systems cure through the halogen functionally of the halogen-containing rubbers of the blend.

Suitable sulfur accelerators include mercaptobenzothiazole and its derivatives, such as mercaptobenzothiazole disulfide, 2,2'-dithiobis(benzothiazole) and its salts; sulfenamides; thiurams, such as tetramethylthiuram; and dithiocarbamate salts, such as cadmium diethyl dithiocarbamate. Typical sulfenamides include N-cyclohexyl-2-benzothiazyl-sulfenamide, and N,N-diisopropyl-2-benzothiazyl-sulfenamide.

Suitable nonsulfur curatives include di- and tri-functional mercapto compounds and their derivatives, such as 2,5-dimercapto-1,3,4-thiadiazole, 2-mercapto-1,3,4-thiadiazole-5-benzoate, trithiocyanuric acid, dithiohydantoins, dimercaptotriazoles, dithioltriazene, and their ester derivatives, alone or together with an appropriate organic base activator as set forth in U.S. Pat. Nos. 4,128,510 and 4,288,576.

Oxides, hydroxides and carbonates of the metals in Groups Ia and IIa of the Periodic Table of the Elements, such as magnesium oxide and barium carbonate, are typical metal compound promotors which can be used to promote the cure by the nonsulfur curative component of the crosslinking compositions of this invention.

The optimum amounts of the crosslinking compositions will depend upon the degree of crosslinking desired, the degree of scorch safety desired, and the rate of cure desired. The determination of the amounts to be used is well within the skill of those in the art.

The sulfur curative system is present in the crosslinking compositions of this invention in an amount, by weight of the rubber blend, from about 1.0 parts to about 20 parts, preferably from about 1.7 parts to about 9 parts, and most preferably about 3.0 parts to about 7 parts. The nonsulfur curative system usually is present in the compositions of this invention in an amount from about 0.3 parts to about 10 parts, preferably from about 0.5 parts to about 7 parts, and most preferably 0.7 parts to about 5 parts.

The sulfur curative system consists essentially of, by weight of the crosslinking composition, from about 0.1 parts to about 5 parts sulfur, preferably from about 0.2 parts to about 1 part; from about 0.1 parts to about 5 parts of a sulfur accelerator, preferably from about 0.5 parts to about 3 parts; and from about 0.5 parts to about 10 parts of a zinc oxide promotor, preferably from about 1.0 parts to about 5 parts, and most preferably from about 1.5 parts to about 3.0 parts.

Typically the nonsulfur curative system contains, by weight of the crosslinking system, from about 0.1 parts to about 5 parts of a nonsulfur curative compound, preferably from about 0.2 parts to about 2 parts, and from about 0.2 parts to about 10 parts of a Group Ia or IIa metal compound promotor, preferably from about 0.3 parts to about 5 parts, and most preferably from about 0.5 parts to about 3.0 parts. The Group Ia or IIa metal compound promotor also functions as an acid acceptor.

The rubber blends can be prepared by blending the rubber compounds together with all desired ingredients, except the crosslinking composition of this invention, in any desired fashion that allows intimate mixing; for example, in a Banbury mixer or two roll differential speed mill.

The crosslinking composition of this invention can then be incorporated or mixed with the blended ingredients in any desired fashion, such as by simply milling the blended ingredients and the crosslinking composition on a conventional rubber mill. Preferably the milling is conducted at 50° C. to about 90° C. Other methods of mixing the crosslinking composition with the polymer will be apparent to those skilled in the art.

Crosslinking is effected at elevated temperatures. In general the crosslinking temperature will be from about 140° C. to about 260° C., preferably from about 150° C. to about 225° C., and most preferably from about 150° C. to about 205° C. The time will vary inversely with the temperature and will range from about 5 seconds to 10 hours. The crosslinking temperatures and times are within the skill of those versed in the art.

As is well known in the art, butyl rubber is a copolymer of from about 95.5 to about 99.5 mole % isobutylene and from about 0.5 to about 4.5 mole % isoprene.

Halobutyl rubbers are halogenated butyl rubbers. The halogen is present as a result of post-treatment of the butyl rubber by reacting chlorine or bromine with the butyl rubber by methods known in the art. Halobutyl rubbers include chlorobutyl, bromobutyl or mixtures of chloro and bromobutyl rubbers.

Such materials include chlorobutyl and bromobutyl rubbers prepared by reacting chlorine or bromine with butyl rubber wherein the original unsaturation (usually from about 0.5 to 3.0 mole % isoprene residues) is largely maintained. A suitable commercially available chlorobutyl rubber contains from about 1.1% to about 1.35% by weight of chlorine from about 0.5 to 2 mole % unsaturation, and has a Mooney viscosity after 8 minutes at 212° F. using the large (4-inch) rotor of 40 to 89 ML. A satisfactory bromobutyl rubber prepared from a highly unsaturated butyl rubber contains from 2.1 to 3.0% by weight of bromine, a density of 25° C. of about 0.96, and evidences a Mooney viscosity at 212° F. of 40 to 70 ML.

Generally, the halobutyl rubber or the mixture of butyl rubber and halobutyl rubber is present in an amount of from about 35% to about 85% by weight of the rubber content, preferably from about 40% to about 75%. Halobutyl rubber is preferred.

Epihalohydrin rubber includes (1) homopolymers of an epihalohydrin, such as epichlorohydrin, epibromohydrin and others, (2) copolymers of an epihalohydrin with less than 30% of saturated epoxy monomers or with an unsaturated epoxy monomer, and (3) terpolymers of an epihalohydrin with (a) less than 30% of a saturated epoxy monomer or mixtures thereof, (b) an unsaturated epoxy monomer or mixtures thereof, or (c) mixtures of (a) and (b). The epihalohydrin polymers are prepared by polymerizing a monomeric epihalohydrin alone or together with one or more of the aforementioned epoxy monomers with a suitable catalyst, such as an organometallic catalyst. For example, a reaction product of water with an alkyl aluminum compound is a suitable organometallic catalyst. Such homopolymers are believed to have a repeating structure:

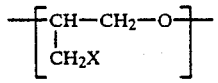

wherein X is a halogen, derived by a polymerization involving the epoxide linkages. Suitable halogens include chlorine and bromine. Typical saturated epoxy monomers include alkylene oxides, such as ethylene oxide, and typical unsaturated epoxy monomers include allylglycidyl ether.

The epihalohydrin polymers are strong, rubbery materials sometimes evidencing more or less crystallinity, having high molecular weight, a density in the range of from about 1.35 to about 1.38, and after 4 min. at 212° F., a Mooney viscosity of from about 40 to about 80 ML. The properties and the preparation of epihalohydrin polymers suitable for use in the practice of this invention are more fully disclosed in U.S. Pat. No. 3,158,500, the disclosure of which is incorporated herein by reference.

Copolymers and terpolymers of an epihalohydrin with greater than 30% of saturated epoxy monomers, especially with alkylene oxide monomers, such as ethylene oxide, do not have the required air impermeability and are not useful in tire inner liners and inner tubes.

Copolymers or terpolymers of epihalohydrin with unsaturated epoxy monomers, such as allylglycidyl ether, tend to occure with the unsaturation of the halobutyl rubber or mixtures thereof in the rubber blend and the natural rubber in the carcass. Preferably, from about 1% to about 30% of an unsaturated epoxy monomer is used. Copolymers and terpolymers of epihalohydrin with a saturated epoxy monomer preferably contain less than about 10% of the saturated epoxy monomer, and most preferably less than about 5%.

Preferably the epihalohydrin rubber is present in an amount of from about 15% to about 65% by weight of the total rubber blend, preferably from about 25% to about 55%.

The amount of (a) halobutyl rubber or mixtures thereof with butyl rubber and (b) epichlorohydrin rubber present in the rubber blend totals 100%.

In addition to the crosslinking composition of this invention, the rubber blend may contain other ingredients commonly used in rubber vulcanization. For example, extenders, fillers, pigments, stabilizers, antioxidants, tackifiers, plasticizers, and softeners may be added. The presence of a filler, particularly carbon black, while not necessary, is beneficial. The particle size of the filler is not critical.

Other additives such as polychloroprene rubber, mineral rubber (blown asphalt), and chlorinated hydrocarbon polymers, such as chlorinated polyisoprene rubber and chlorinated polyolefins, may be present in an amount from about 1% to about 10% by weight of the rubber blend.

Typically the chlorinated hydrocarbon polymers have a chlorine content of from about 30% to about 70%, by weight, preferably 40% to about 66%, and a molecular weight of about 50,000 to about 1,000,000 as determined by size exclusion chromatography. Chlorinated polyisoprene having from about 63% to about 66% by weight chlorine is the preferred chlorinated hydrocarbon polymer.

The polychloroprene improves green strength, the mineral rubber improves aged adhesion, and the chlorinated hydrocarbon polymers generally tend to improve the impermeability to air and other gases.

The following examples set forth in Table 1 illustrate the invention. The controls or comparative examples are set forth in Table 2. The examples and the controls are prepared by the same procedure as set forth above. The properties of the examples and controls are set forth in Tables 3 and 4, respectively.

All parts and percentages in this specification are by weight unless otherwise indicated.

TABLE 1

| Ingredients | Examples, Parts by Wt. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Chlorobutyl rubber[a] | 75 | 75 | 75 | 75 | 60 | 50 | 75 | 75 | 75 | 75 | — | — | — | 37.5 | 75 |
| Bromobutyl rubber[b] | — | — | — | — | — | — | — | — | — | — | 75 | 75 | 37.5 | — | — |

TABLE 1-continued

| Ingredients | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Butyl rubber[c] | — | — | — | — | — | — | — | — | — | — | — | — | 37.5 | 37.5 | 25 |
| Polyepichlorohydrin | 25 | 25 | 25 | 25 | 40 | 50 | 25 | 25 | 25 | 25 | 25 | 25 | 25 | 25 | — |
| Carbon black N-990[d] | 50 | — | 50 | — | — | — | — | — | — | — | — | — | — | — | 50 |
| Carbon black N-762[e] | — | 50 | — | 50 | 50 | 50 | 50 | 50 | 50 | 50 | 50 | 50 | 50 | 50 | — |
| Stearic acid | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Alkyl phenolic resin, Ring & Ball s. pt. of 90° C. | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 |
| Chlorinated polyisoprene rubber (~65% chlorine) | — | — | — | — | — | — | — | — | — | — | — | — | — | — | 10 |
| Paraffin oil[f] | 8.3 | — | 8.3 | — | — | — | — | — | — | — | — | — | — | — | — |
| Nickel dibutyl dithiocarbamate | 1.0 | 1.0 | — | — | 1.0 | 1.0 | 1.0 | 1.0 | 1.0 | 1.0 | 1.0 | 1.0 | 1.0 | 1.0 | 1.0 |
| Magnesium oxide | 0.625 | 0.625 | 0.625 | 0.625 | 1.25 | 1.25 | 0.62 | 0.25 | 3.0 | 0.62 | 1.25 | 1.25 | 1.0 | 0.25 | 0.625 |
| Zinc oxide (ZnO) | 2.25 | 2.25 | 2.25 | 2.25 | 1.75 | 1.5 | 1.0 | 2.25 | 2.25 | 4.0 | 2.25 | 2.25 | 3.0 | 3.0 | 2.25 |
| Mercaptobenzothiadiazole disulfide | 2.0 | 2.0 | 2.0 | 2.0 | 0.825 | 0.75 | 1.13 | 1.13 | 1.13 | 3.0 | 3.0 | 3.0 | 2.0 | 2.0 | 2.0 |
| Sulfur | 0.375 | 0.375 | 0.375 | 0.375 | 0.275 | 0.25 | 0.2 | 0.38 | 0.38 | 0.6 | 0.4 | 0.4 | 0.37 | 0.37 | 0.375 |
| Ethylene thiourea | — | — | — | — | — | — | — | — | — | — | — | — | — | — | — |
| 2-Mercapto-1,3,4-thiadiazole-5-benzoate[g] | 0.7 | 0.7 | 0.7 | 0.7 | 1.25 | 1.4 | 0.7 | 0.25 | 0.25 | 0.7 | 0.3 | 0.7 | 0.2 | 0.3 | 0.7 |
| Tetramethylthiuram disulfide | — | — | — | — | — | — | — | — | — | — | — | — | 0.2 | 0.37 | — |

[a]Chlorinated isoprene-isobutylene copolymer, mole % unsaturation ~1.7%; ~1.2% chlorine content; and 55 Mooney viscosity at 100° C.
[b]Brominated isoprene-isobutylene copolymer, mole % unsaturation ~1.6%; ~2.1% bromine content and 40 Mooney viscosity at 100° C.
[c]Isoprene-isobutylene copolymer, mole % unsaturation ~1.4% and 45 Mooney viscosity at 100° C.
[d]ASTM D-1510, $I_2$ absorption = 7.
[e]ASTM D-1510, $I_2$ absorption = 26.
[f]2640 SUS viscosity at 100° F.
[g]Sixty-six percent (66%) active on clay.

TABLE 2

| Ingredients | 1 | 2 | 3 | 4 | 5 |
|---|---|---|---|---|---|
| Chlorobutyl rubber[a] | 75 | 75 | 25 | 75 | 75 |
| Bromobutyl rubber[b] | — | — | — | — | — |
| Butyl rubber[c] | — | — | — | — | — |
| Polyepichlorohydrin | 25 | 25 | 75 | 25 | 25 |
| Carbon black N-990[d] | 50 | — | — | — | — |
| Carbon black N-762[e] | — | 50 | 50 | 50 | 50 |
| Stearic acid | 1.0 | 1.0 | 1.0 | 1.0 | 1.0 |
| Alkyl phenolic resin, Ring & Ball s. pt. of 90° C. | 3.3 | 3.3 | 3.3 | 3.3 | 3.3 |
| Chlorinated polyisoprene rubber (~65% chlorine) | — | — | — | — | — |
| Paraffin oil[f] | 8.3 | — | — | — | — |
| Nickel dibutyl dithiocarbamate | — | — | 1.0 | — | — |
| Magnesium oxide | 2.25 | 2.25 | 1.88 | — | 1.25 |
| Zinc oxide (ZnO) | — | — | 0.75 | 3.0 | — |
| Mercaptobenzothiadiazole disulfide | — | — | 0.375 | 1.5 | — |
| Sulfur | — | — | 0.12 | 0.5 | — |
| Ethylene thiourea | 0.75 | 0.75 | — | — | — |
| 2-Mercapto-1,3,4-thiadiazole-5-benzoate[g] | — | — | 2.1 | — | 3.0 |
| Tetramethylthiuram disulfide | — | — | — | — | — |

[a]Chlorinated isoprene-isobutylene copolymer, mole % unsaturation ~1.7%; ~1.2% chlorine content; and 55 Mooney viscosity at 100° C.
[b]Brominated isoprene-isobutylene copolymer, mole % unsaturation ~1.6%; ~2.1% bromine content and 40 Mooney viscosity at 100° C.
[c]Isoprene-isobutylene copolymer, mole % unsaturation ~1.4% and 45 Mooney viscosity at 100° C.
[d]ASTM D-1510, $I_2$ absorption = 7.
[e]ASTM D-1510, $I_2$ absorption = 26.
[f]2640 SUS viscosity at 100° F.
[g]Sixty-six percent (66%) active on clay.

TABLE 3

| Properties | 1 | 2 | 3 | 4 | 5 | 6 | 7 |
|---|---|---|---|---|---|---|---|
| Adhesion to Tire Carcass[a] | | | | | | | |
| T-Peel lbs/in-pli | 58 | 54 | 38 | 42 | 48 | 37 | 40 |
| ODR Cure at 171° C.[b] | | | | | | | |
| Minimum, in-lbs | 5.0 | 10.5 | 5.5 | 10.5 | 14 | 15.5 | 11.6 |
| Type | MHF[f] | MHF | MHF | MHF | MHF | MHF | MHF |
| Maximum, in-lbs | 22.2 | 38.0 | 19.5 | 36 | 40 | 42 | 30 |
| Ts2, min. | 2.6 | 2.2 | 2.5 | 2.2 | 2.1 | 2.0 | 3.0 |
| $T_c(90)$, min | 6.4 | 8.25 | 6.0 | 8.5 | 9.0 | 9.0 | 15.5 |
| Mooney Scorch @ 121° C.[c] | | | | | | | |
| Minimum viscosity | 14 | 27.0 | 13.5 | 26.5 | 27.5 | 28.0 | 27.0 |
| Time to 3 pt. rise, min. | 30 | 23.5 | >30 | 26.5 | 20.5 | 21.0 | 28.5 |
| Time to 5 pt. rise, min. | >30 | 31 | >30 | >30 | 26.5 | 26.0 | >30 |
| Physical Properties[d] | | | | | | | |
| 100% Modulus, psi | 110 | 230 | 110 | 230 | 245 | 255 | 200 |
| 200% Modulus, psi | 150 | 400 | 150 | 400 | 410 | 410 | 390 |
| 300% Modulus, psi | 200 | 520 | 200 | 520 | 520 | 540 | 480 |

TABLE 3-continued

| | Examples, Parts by Wt. | | | | | | |
|---|---|---|---|---|---|---|---|
| Tensile strength, psi | 920 | 1300 | 940 | 1350 | 1300 | 1300 | 960 |
| % Elongation | 760 | 770 | 740 | 760 | 770 | 780 | 780 |
| Shore A Hardness | 47 | 60 | 50 | 62 | 63 | 64 | 60 |
| Air Permeability at 66.7C[e] | | | | | | | |
| $\frac{10^{-10} cm^2 \, cm}{cm^3 \, sec \, cm \, Hg}$ | 4.2 | 3.0 | 4.2 | 3.1 | 2.9 | 2.7 | 3.1 |

| Properties | 8 | 9 | 10 | 11 | 12 | 13 | 14 | 15 |
|---|---|---|---|---|---|---|---|---|
| Adhesion to Tire Carcass[a] | | | | | | | | |
| T-Peel lbs/in-pli | 38 | 53 | 58 | 55 | 48 | 45 | 32 | 52 |
| ODR Cure at 171° C.[b] | | | | | | | | |
| Minimum, in-lbs | 11.9 | 12.5 | 10.5 | 9.6 | 10.2 | 10.0 | 11.0 | 12.0 |
| Type | MHF | MHF | MHF | MHF | MHF | MH[g] | MH | MHF |
| Maximum, in-lbs | 33 | 38 | 40 | 38 | 40 | 30 | 33 | 42 |
| Ts2, min. | 2.5 | 2.0 | 2.5 | 2.5 | 2.0 | 3.5 | 3.75 | 2.3 |
| T$_c$(90), min | 14.0 | 11.0 | 10.5 | 10.5 | 8.0 | 16.5 | 18.0 | 8.0 |
| Mooney Scorch @ 121° C.[c] | | | | | | | | |
| Minimum viscosity | 26.0 | 27.0 | 26.0 | 24.0 | 26.5 | 23.5 | 25.5 | 28.5 |
| Time to 3 pt. rise, min. | 24.0 | 18.5 | 19.0 | 28.0 | 16.75 | 24.5 | 23.0 | 21.0 |
| Time to 5 pt. rise, min. | >30 | 25.0 | 28.75 | >30 | 22.5 | 28.0 | 26.5 | 28.5 |
| Physical Properties[d] | | | | | | | | |
| 100% Modulus, psi | 210 | 230 | 280 | 260 | 280 | 240 | 245 | 250 |
| 200% Modulus, psi | 400 | 450 | 520 | 430 | 400 | 410 | 400 | 440 |
| 300% Modulus, psi | 490 | 540 | 720 | 550 | 572 | 540 | 530 | 560 |
| Tensile strength, psi | 1080 | 1170 | 1200 | 1360 | 1420 | 1580 | 1620 | 1100 |
| % Elongation | 720 | 640 | 500 | 740 | 670 | 750 | 730 | 690 |
| Shore A Hardness | 60 | 62 | 67 | 65 | 68 | 64 | 62 | 65 |
| Air Permeability at 66.7C[e] | | | | | | | | |
| $\frac{10^{-10} cm^2 \, cm}{cm^3 \, sec \, cm \, Hg}$ | 3.1 | 3.0 | 2.9 | 3.0 | 2.9 | 3.1 | 3.1 | 2.8 |

[a]Cured adhesion is measured by placing together a sheet (80 mil thick) of the uncured tire carcass compound with crosslinkers added and a sheet (80 mil) of uncured rubber blends containing the crosslinking compositions of this invention. A polyester film is placed between the sheets at one end to provide a tab for pulling. Each sheet is backed with a cloth sheet. The pad is placed in a mold about 160 mil deep. The pad is cured for 15 minutes at 182° C. One-inch wide strips are cut and the peel adhesion is determined by measuring the force to pull apart the cured strips according to the procedures of ASTM D418-38. The average of three pulls is reported.
[b]Oscillating disc rheometer ASTM D-2084-71-T.
[c]ASTM D-1646.
[d]ASTM D-412.
[e]For vulcanizates cured at 160° C. for 30 min.
[f]Equilibrium torque.
[g]Highest value of torque where no constant or maximum is obtained.

TABLE 4

| | Controls, Parts by Wt. | | | | |
|---|---|---|---|---|---|
| Properties | 1 | 2 | 3 | 4 | 5 |
| Adhesion to Tire Carcass[a] | | | | | |
| T-Peel lbs/in-pli | 35 | 45 | 15 | 42 | 34 |
| ODR Cure at 171° C.[b] | | | | | |
| Minimum, in-lbs | 5.5 | 10 | 17.5 | 10.5 | 10.5 |
| Type | MH[g] | MH | MHF[f] | MHF | MH |
| Maximum, in-lbs | 11.0 | 21.0 | 48 | 35.0 | 32.8 |
| Ts2, min. | 7.5 | 3.8 | 1.8 | 2.0 | 2.0 |
| T$_c$(90), min | 34 | 37 | 12.6 | 17.5 | 25.5 |
| Mooney Scorch @ 121° C.[c] | | | | | |
| Minimum viscosity | 15 | 27.5 | 32.0 | 27.0 | 27.0 |
| Time to 3 pt. rise, min. | 19.5 | 14.5 | 12.0 | 12.0 | 10.5 |
| Time to 5 pt. rise, min. | 23.5 | 16.75 | 16.5 | 14.5 | 12.75 |
| Physical Properties[d] | | | | | |
| 100% Modulus, psi | 90 | 200 | 270 | 140 | 230 |
| 200% Modulus, psi | 120 | 310 | 460 | 270 | 360 |
| 300% Modulus, psi | 140 | 410 | 585 | 410 | 470 |
| Tensile strength, psi | 340 | 780 | 1280 | 1310 | 700 |
| % Elongation | 1030 | 710 | 820 | 830 | 840 |
| Shore A Hardness | 43 | 57 | 66 | 57 | 57 |
| Air Permeability at 66.7C[e] | | | | | |
| $\frac{10^{-10} cm^2 \, cm}{cm^3 \, sec \, cm \, Hg}$ | 4.5 | 3.2 | 2.4 | 3.2 | 3.0 |

[a]Cured adhesion is measured by placing together a sheet (80 mil thick) of the uncured tire carcass compound with crosslinkers added and a sheet (80 mil) of uncured rubber blends containing the crosslinking compositions of this invention. A polyester film is placed between the sheets at one end to provide a tab for pulling. Each sheet is backed with a cloth sheet. The pad is placed in a mold about 160 mil deep. The pad is cured for 15 minutes at 182° C. One-inch wide strips are cut and the peel adhesion is determined by measuring the force to pull apart the cured strips according to the procedures of ASTM D418-38. The average of three pulls is reported.
[b]Oscillating disc rheometer ASTM D-2084-71-T.
[c]ASTM D-1646.
[d]ASTM D-412.
[e]For vulcanizates cured at 160° C. for 30 min.
[f]Equilibrium torque.
[g]Highest value of torque where no constant or maximum is obtained.

Adhesion to the tire carcass of at least 25 T-Peel lbs./in.-pli is acceptable; however, preferably it is greater than 30 T-Peel lbs./in.-pli.

A Mooney scorch of 16 minutes or better is good for the 3 point rise, and 20 minutes or better is good for the 5 point rise.

Tensile strength of at least 900 psi is acceptable, preferably greater than 900 psi.

Control 1 shows that a rubber blend containing a large particle size carbon black and oil when crosslinked with magnesium oxide and ethylene thiourea conventional crosslinking system does not provide an acceptable tensile strength, whereas the same rubber-based composition (Example 1) when it is cured with the crosslinking composition of this invention does provide acceptable tensile strength.

Control 2 shows that the same rubber blend containing small particle size carbon black and no oil when crosslinked with a conventional crosslinking system likewise does not provide an acceptable tensile strength or scorch safety, whereas the same composition (Example 2) when it is cured with the crosslinking composition of this invention does provide acceptable tensile strength and scorch safety.

Control 3 shows that a rubber blend containing a smaller amounts of chlorobutyl rubber (25%) when crosslinked with the crosslinking system of this invention does not provide a material having acceptable scorch or adhesion properties.

Control 4 shows that the sulfur curative system alone and Control 5 shows that the nonsulfur curative system alone, when used to crosslink a representative rubber blend, do not provide materials having acceptable scorch properties. Further, nonsulfur curative system alone (Control 5), does not provide a material having acceptable tensile strength properties.

Usually oil makes rubber compositions more permeable to gases. While the composition of Example 1 is more permeable to gases than the composition of Example 2, it still has improved scorch safety, cure rate and physical properties.

The tire carcass is typically natural rubber with other rubbers, such as styrene-butadiene, added in lesser amounts and cured with a conventional sulfur cure system.

Thus, this invention provides a sulfur and nonsulfur crosslinking composition especially adapted for crosslinking blends of (a) halobutyl rubber or a mixture of butyl rubber and halobutyl rubber wherein the halobutyl rubber is at least 50% by weight of the mixture; and (b) an epihalohydrin rubber. Rubber blends cured with the compositions of this invention have a better balance of cure rate, cure state, scorch safety and physical properties and have improved adhesion to the tire carcasses and good impermeability to gases. The cured rubber material is especially useful in tire inner tubes and tire inner liners, particularly in a pneumatic tire having cured rubber liner ply overlying all internal tire surfaces exposed in service to pressurized gas.

The expression "consists essentially of" and "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A cross-linking composition for crosslinking a blend from about 140° C. to about 260° C. from about 5 seconds to 10 hours of (A) halobutyl rubber or a mixture of butyl rubber and halobutyl rubber wherein at least 50% by weight of the mixture is halobutyl rubber and (B) an epichlorohydrin rubber consisting essentially of, for each 100 parts by weight of the rubber blend;
   (a) from about 1.0 parts to about 20 parts of a sulfur curative system consisting essentially of (i) sulfur, (ii) an accelerator, and (iii) a zinc oxide promotor; and
   (b) from about 0.3 parts to about 10 parts of a nonsulfur curative system consisting essentially of (i) a non-sulfur curative selected from the group consisting of di- and tri-functional mercapto compounds and derivatives thereof; and (ii) a metal compound promotor selected from the group consisting of oxides, hydroxides, and carbonates of metals in Groups Ia and IIa.

2. The composition of claim 1 wherein the sulfur is present in an amount from about 0.1 parts to about 5 parts.

3. The composition of claim 1 wherein the accelerator is present in an amount from about 0.1 parts to about 5 parts.

4. The composition of claim 3 wherein the accelerator is selected from the group consisting of mercaptobenzothiazole, mercaptobenzothiazole derivatives, sulfenamides, thiurams, and dithiocarbamate salts.

5. The composition of claim 4 wherein the accelerator is mercaptobenzothiazole disulfide.

6. The composition of claim 1 wherein zinc oxide promotor is present in an amount from about 0.5 parts to about 10 parts.

7. The composition of claim 1 wherein the nonsulfur curative is present in an amount from about 0.1 parts to about 5 parts.

8. The composition of claim 7 wherein the nonsulfur curative compound is a 2-mercapto-1,3,4-thiadiazole-5-benzoate.

9. The composition of claim 1 wherein (b)(ii) is selected from the group consisting of magnesium oxide and barium carbonate.

10. The composition of claim 1 wherein (b)(ii) is present in an amount from about 0.2 parts to about 10 parts.

11. The composition of claim 1 wherein (a) is present in an amount from about 1.7 parts to about 9 parts; and (b) is present in an amount from about 0.5 parts to about 7 parts.

12. The composition of claim 11 wherein (a)(i) is present in an amount from about 0.2 parts to about 1 parts; (a)(ii) is present in an amount from about 0.5 parts to about 3 parts; (a)(iii) is present in an amount from about 1.0 parts to about 5 parts; (b)(i) is present in an amount from about 0.2 parts to about 2 parts; and (b)(ii) is present in an amount from about 0.3 parts to about 5 parts.

13. A crosslinkable rubber composition comprising:
   (I) a rubber blend of (a) from about 35% to about 85%, by weight of the rubber blend, of a rubber selected from the group consisting of (i) halobutyl rubber and (ii) a mixture of butyl rubber and halobutyl rubber wherein halobutyl rubber is present in an amount of at least 50% by weight of the mixture; and (b) from about 15% to about 65%, by weight of the rubber blend, of an epihalohydrin rubber;

(II) a crosslinking composition consisting essentially of (a) from about 1.0 parts to about 20 parts of a sulfur curative system comprising (i) sulfur, (ii) an accelerator, and (iii) a zinc oxide promotor; and (b) from about 0.3 parts to about 10 parts of a nonsulfur curative system comprising (i) a nonsulfur curative selected from the group consisting of di- and trifunctional mercapto compounds and derivatives thereof; and (ii) a metal compound promotor selected from the group consisting of oxides, hydroxides, and carbonates of metals in Groups Ia and IIa.

14. The composition of claim 13 wherein the halobutyl rubber is selected from the group consisting of chlorobutyl rubber, bromobutyl rubber and mixtures of chlorobutyl and bromobutyl rubber.

15. The composition of claim 14 wherein the halobutyl rubber is a chlorobutyl rubber.

16. The composition of claim 14 wherein the halobutyl rubber is a bromobutyl rubber.

17. The composition of claim 13 wherein the epihalohydrin rubber is selected from the group consisting of epichlorohydrin, epibromohydrin, coplymers of epihalohydrin with less than 30% of a saturated epoxy monomers, copolymers of epihalohydrin with an unsaturated epoxy monomer, terpolymers of epihalohydrin with monomers selected from the group consisting of (a) less than 30% of a saturated epoxy monomer, (b) an unsaturated epoxy monomer, and (c) mixtures of (a) and (b).

18. The composition of claim 13 which further comprises from about 1% to about 10%, by weight of the rubber blend, of a chlorinated polyisoprene rubber.

19. The crosslinked composition of claim 13.
20. The crosslinked composition of claim 14.
21. The crosslinked composition of claim 15.
22. The crosslinked composition of claim 16.

* * * * *